(12) United States Patent
Negishi

(10) Patent No.: US 8,373,873 B2
(45) Date of Patent: Feb. 12, 2013

(54) APPARATUS AND METHOD FOR DETERMINING EXECUTION ORDER OF PRIVATE PRINT JOBS IN A VARIABLE PRINT SYSTEM

(75) Inventor: Akira Negishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 614 days.

(21) Appl. No.: 12/545,119

(22) Filed: Aug. 21, 2009

(65) Prior Publication Data

US 2010/0064176 A1 Mar. 11, 2010

(30) Foreign Application Priority Data

Sep. 10, 2008 (JP) ................................. 2008-232398

(51) Int. Cl.
*G06K 15/00* (2006.01)
(52) U.S. Cl. ...................... 358/1.14; 358/1.15; 358/1.18; 358/1.13; 358/1.1; 715/243; 715/209; 715/234; 707/705; 382/173; 345/471
(58) Field of Classification Search .......................... None
See application file for complete search history.

(56) References Cited

U.S. PATENT DOCUMENTS

2007/0240039 A1* 10/2007 Hosotsubo .................... 715/517

FOREIGN PATENT DOCUMENTS

JP 2007-316873 12/2007
WO 02-08861 A2 1/2002

OTHER PUBLICATIONS

Extended European Search Report issued on Sep. 21, 2012, in counterpart European application No. 09169141.0.

* cited by examiner

*Primary Examiner* — Benny Q Tieu
*Assistant Examiner* — Paul F Payer
(74) *Attorney, Agent, or Firm* — Fitzpatrick, Cella, Harper & Scinto

(57) ABSTRACT

A data processing apparatus allocates a page number in a record to each of a plurality of records of a variable data print job and performs a preflight check every page number. After that, the data processing apparatus extracts the records in which the same kind of (or same) problem has occurred in a page of the same page number from the records included in the variable data print job. The data processing apparatus calculates a ratio of the extracted records to all records having the page of the page number and presumes whether the problem relates to a master object or relates to a variable object according to the ratio. The data processing apparatus displays whether the problem in the page relates to the master object or relates to the variable object every page having the problem.

6 Claims, 15 Drawing Sheets

APPARATUS AND METHOD FOR DETERMINING EXECUTION ORDER OF PRIVATE PRINT JOBS IN A VARIABLE PRINT SYSTEM

BACKGROUND OF THE INVENTION

1. Field of the Invention

The present invention relates to a data processing apparatus, a preflight checking method, and a computer program. More particularly, the invention is suitable when it is used to check a job before the job is output.

2. Description of the Related Art

In an electrophotographic printer called a POD (Print On Demand) apparatus, a printing including a variable data portion called a variable data printing is used as a killer application. The variable data printing is effective to formation of direct mail or the like having a high effect. A PPML (Personalized Print Markup Language) has been known as a language which can describe (define) multimedia contents by a variable data format. The PPML is a language for a digital printing system using an XML (eXtensible Markup Language) as a base. The PPML is an open language proposed from PODi as an architecture for realizing the variable data printing.

In the printing industry, in order to avoid a printing failure, before the printing is actually started, a process of a step called a preflight for checking whether or not a print job is proper (checking, for example, a font and an image) is executed. In such a service that a manuscript of a document based on data is received from the user and printed, the operator performs the preflight check to the received document by using a print system. As a result of the preflight check, if it is determined that there is no problem in the printing of the document, the document is printed.

More specifically describing, the preflight check is such a check that in order to prevent such a situation that after the printing was actually started, the operation is interrupted because of the absence of necessary resources or the like, the contents of the document are checked prior to executing the actual printing. Items regarding the resources necessary to print the document are mainly included in check items in the related art in the preflight check. Specifically speaking, items such as type of font included in the document, the presence or absence of embedding of the font, name of a color profile, and resolution of image data are included.

With respect to a group of check items designated by the operator, the document as a check target is checked. When a check result is reported, information showing whether or not any problem has been found out is shown every check item. Further, a page number, an object name, and a location on an actual print image in which the problem has been found out are shown as detailed information of the check result.

The preflight in the variable data printing has already been proposed. In the Official Gazette of Japanese Patent Application Laid-Open No. 2007-316873, a document which is common among records is used as a base and the preflight check is performed to a print job in which variable data is inserted to a fixed container frame. Specifically speaking, whether or not the variable data overflows from the container frame is checked.

However, if the result of the preflight is reported in a form similar to that of the ordinary printing even in the variable data printing, there is a risk that information showing whether the found-out problem is a problem of a master portion which is common among the records or a problem of the variable portion cannot be reported to the operator in an easy-understanding form. Generally, although the data in the master portion and the data in the variable portion have been stored at different locations, those data are synthesized and printed. If "the page number, the object name, and the location on the actual print image" in which the problem found out by the preflight check has occurred are merely displayed, the operator cannot easily discriminate that the problem should be solved by confirming which one of the master portion and the variable portion.

The invention is made in consideration of such a problem and it is an object of the invention to enable a result of a preflight check of a job including variable data to be reported easier than that in the related art.

SUMMARY OF THE INVENTION

To solve the above problem, according to the invention, there is provided a data processing apparatus comprising: an analyzing unit that analyzes data for outputting a document by synthesizing a common object which is common among a plurality of records and a variable object which can vary among the plurality of records; an extracting unit that extracts the number of records in which a problem has occurred in a same page by using a result analyzed by the analyzing unit; a predicting unit that predicts whether the problem has been caused by the common object or has been caused by the variable object by using the number of records extracted by the extracting unit; and an output unit that outputs a result predicted by the predicting unit.

Further features of the present invention will become apparent from the following description of exemplary embodiments with reference to the attached drawings.

DESCRIPTION OF THE EMBODIMENTS

An exemplary embodiment of the invention will be described hereinbelow with reference to the drawings. In the embodiment, a document print system will be described as an example of a document output system. However, a feature of the invention relates to a preflight in the case of outputting a document including variable data. Therefore, the invention is not limited to the printing but can be also applied to a case of performing an output such as a display or the like.

<Example of Construction of Document Print System in Embodiment>

Figure 1:
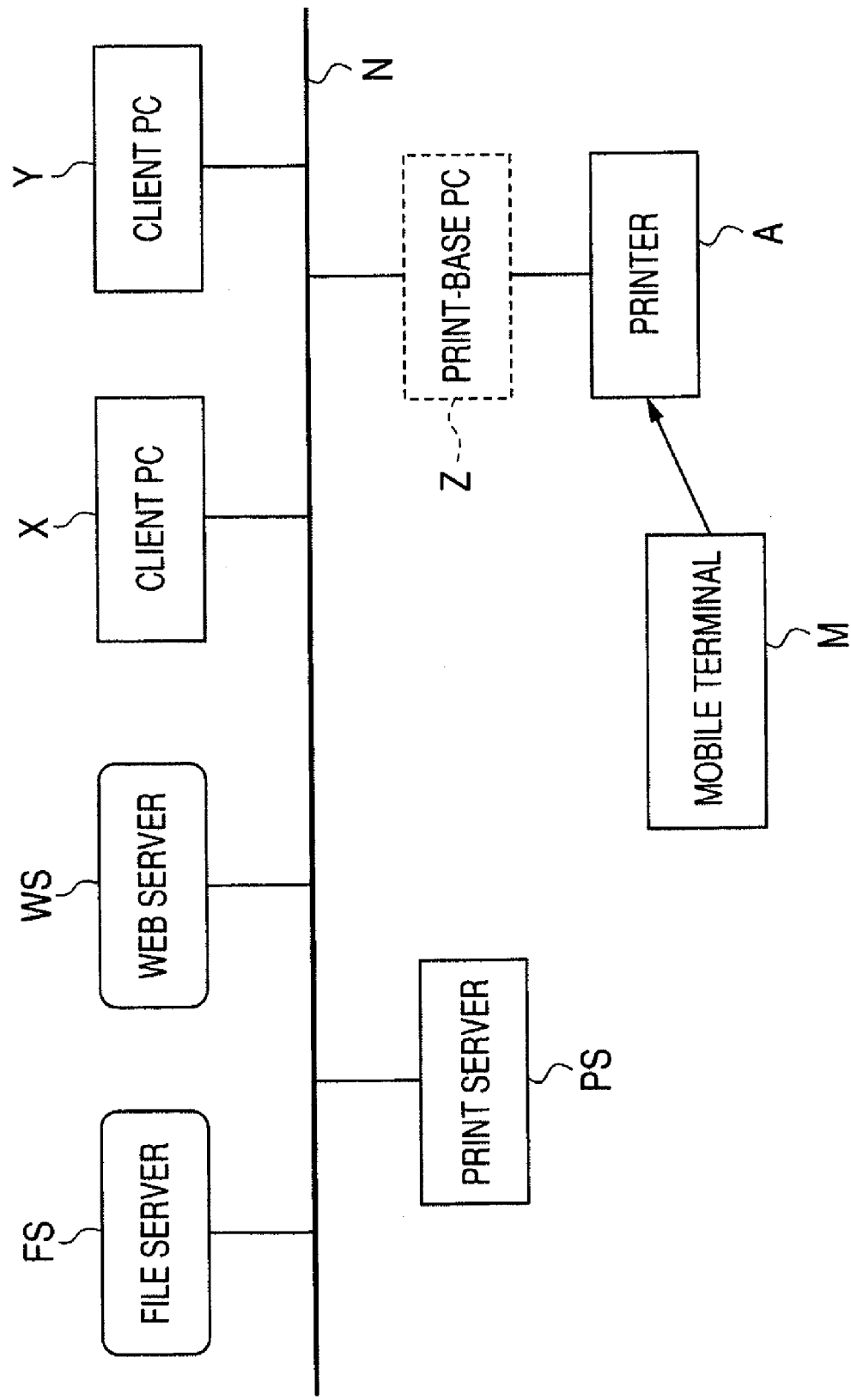
FIG. 1 illustrates an embodiment of the invention and is a diagram showing an example of a system construction of a document print system.

FIG. 1 is a diagram illustrating an example of a system construction of the document print system according to the embodiment.

In FIG. 1, the document print system has a construction in which various kinds of devices are connected to a network N. In this instance, a plurality of personal computers (hereinbelow, referred to as client personal computers) X and Y, one file server FS, one Web server WS, one print server PS, and at least one printer A are connected to the network N. A mobile terminal M, such as an information appliance, is not connected to the network N but is directly connected to the printer A through IrDA, RS-232C, Centronics, or the like so that it can communicate with the printer. In place of the client personal computers X and Y, an information processing apparatus such as word processor, work station, or information appliance can be also connected. A font data group regarding a plurality of kinds of fonts, Web data, image data, and the like have been stored in the client personal computers X and Y and the file server FS.

Figure 2:
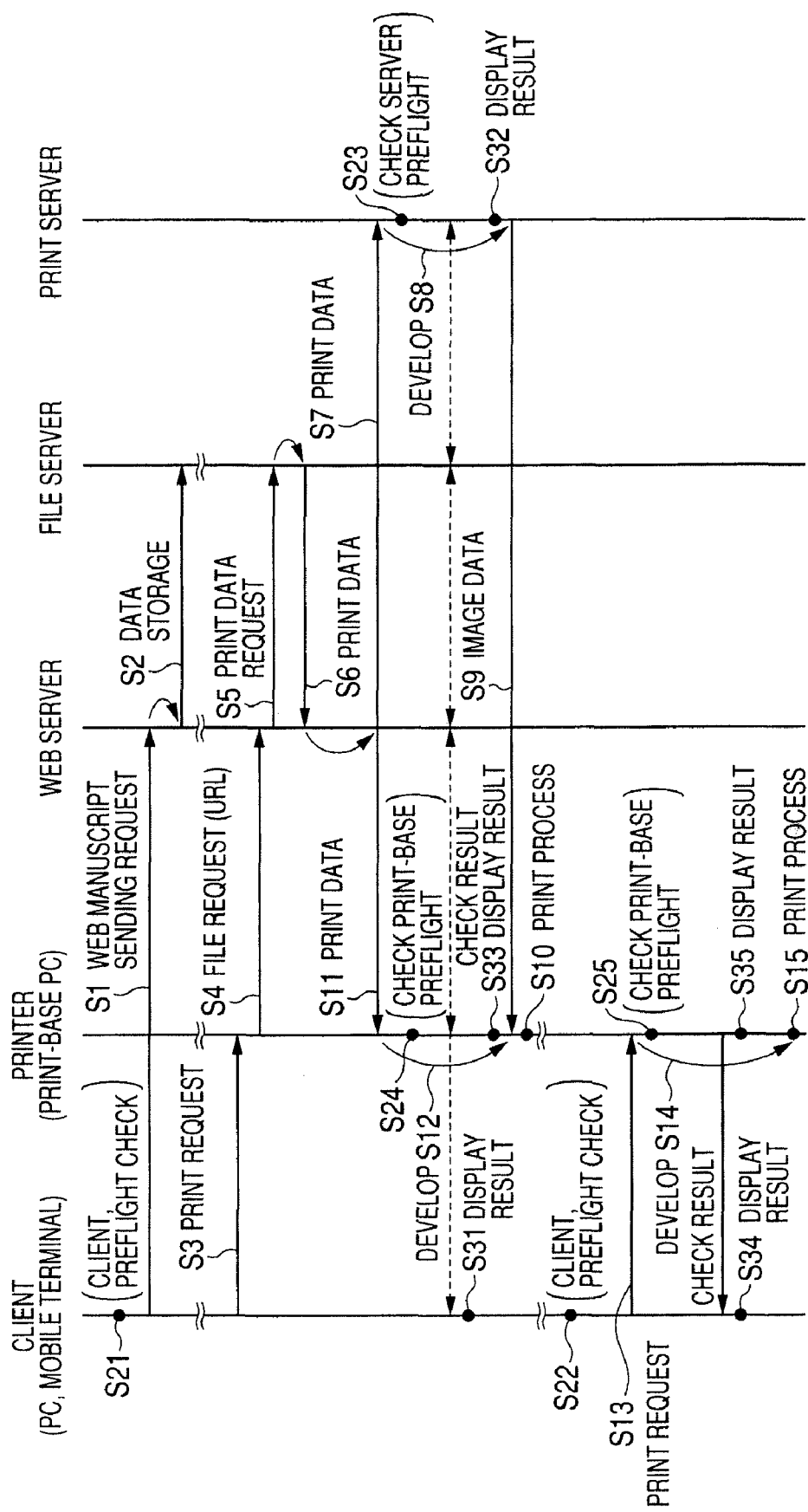
FIG. 2 illustrates the embodiment of the invention and is a diagram for describing an example of an outputting process of a document.

FIG. 2 is a diagram for describing an example of an outputting process of a document.

In FIG. 2, the mobile terminal M or the client personal computers X and Y make a Web manuscript sending request including the document data and print control information to the Web server WS (step S1). The Web server WS which has received the Web manuscript sending request transmits the document data and the print control information to the file server FS (step S2). The file server FS stores the print data including the document data and the print control information (step S2). The font data and the like are included in the print control information.

After that, a print request including a URL of the Web in which the document exists (or a location in which the document such as PDF data or the like exists) and the number of prints is issued from the mobile terminal M or the client personal computers X and Y to the printer A (step S3). A file request is issued from the printer A to the Web server WS (step S4). The Web server WS collects the print data including the necessary document data and font data from the file server FS (steps S5 and S6). The Web server WS transfers the print data to the print server PS (step S7). The print server PS develops the document data included in the transferred print data into bitmap data (image data) (step S8) and transmits to the printer A (step S9). The printer A executes a printing process of the bitmap data (step S10).

There is also a case where the Web server WS directly transmits the print data to the printer A (step S11). In this case, the printer A develops the document data included in the transmitted print data into bitmap data (step S12) and executes the printing process (step There is also a case where the mobile terminal M or the client personal computers X and Y directly issue the print request to the printer A (step S13). The document data and the print control information are included in the print request at this time. In this case, the printer develops the document data included in the print request into the bitmap data (step S14) and executes the printing process (step S15).

Since other processes illustrated in FIG. 2 are a characteristic portion in the embodiment, they will be described in detail hereinafter.

Although the network N is illustrated like a LAN in FIG. 1, the network N is not limited to the LAN. For example, the client personal computers X and Y may be connected to each of the servers FS, PS, and WS and the printer A at a remote distance through the Internet or the like. In such a case, for example, at a print base, the printer A may be connected to the network N through a print-base personal computer Z. In this case, the preflight check at the print base, which will be described hereinbelow, is performed by the print-base personal computer Z. If the file server FS and the print server PS exist in the print base, the file server FS and the print server PS may perform the preflight check at the print base. Further, if the printer A has a function as a personal computer, the printer A itself may perform the preflight check.

<Constructional Example of Personal Computers and Servers in the Embodiment>

Figure 3:
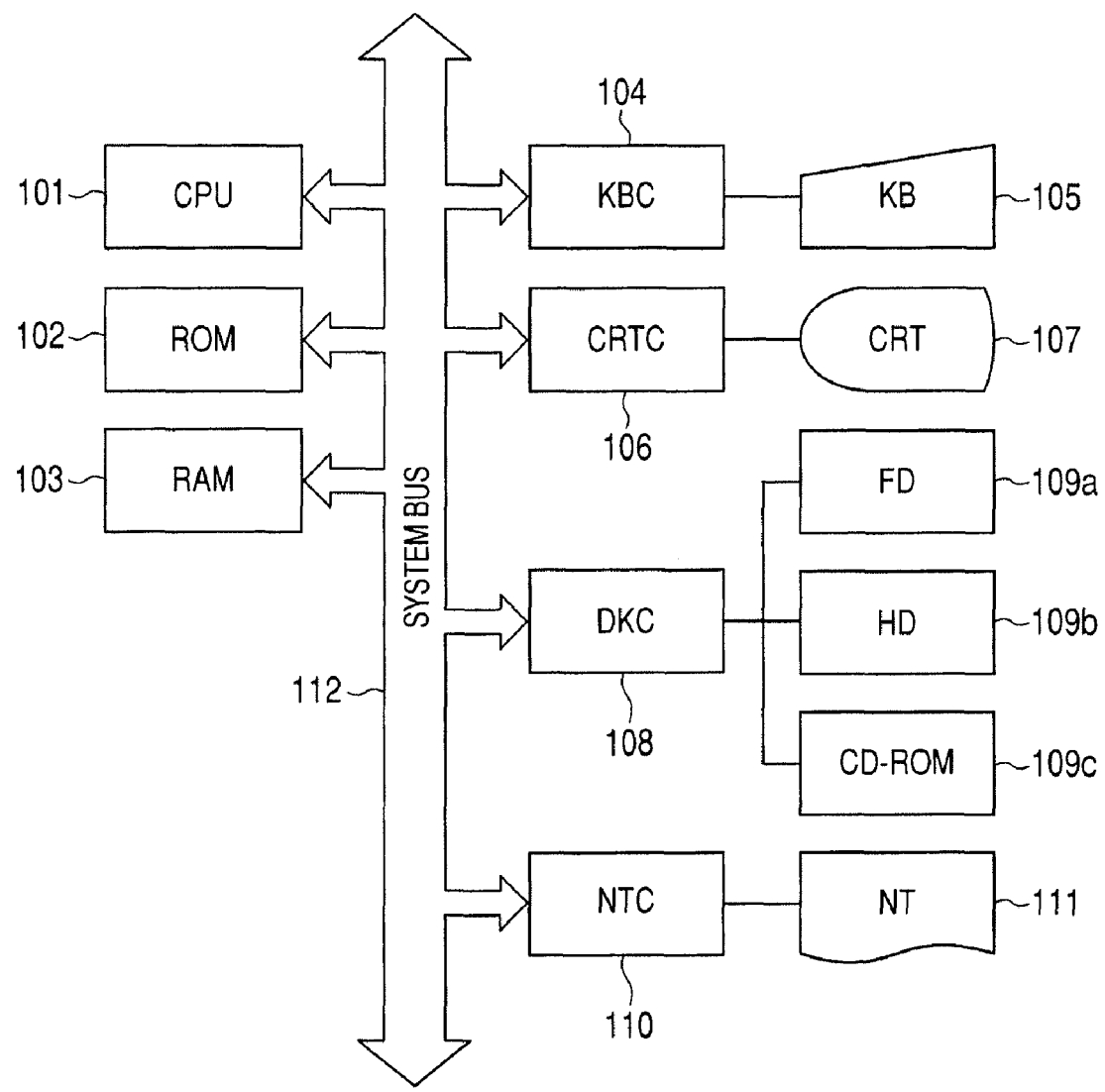
FIG. 3 illustrates the embodiment of the invention and is a block diagram showing an example of a schematic construction of client personal computers, a file server, a Web server, a print-base personal computer, and a print server.

FIG. 3 is a block diagram illustrating an example of a schematic construction of the client personal computers X and Y, file server FS, Web server WS, print-base personal computer Z, and print server PS.

In FIG. 3, a CPU (central processing unit) 101 makes control of the whole apparatus and executes an arithmetic operating process and the like. A system activating program, a basic I/O program, and character pattern data (font data) for converting character codes into bit patterns, and the like have been stored in a ROM (read only memory) 102. A RAM (random access memory) 103 temporarily stores data which is used for arithmetic operations of the CPU 101, arithmetic operation results, a character pattern data string converted from the character codes in order to display, graphics data, image data, and the like.

A KBC (keyboard control unit) 104 receives key input data (character code or control code) from a KB (keyboard) 105 and transfers to the CPU 101. A CRTC (display control unit) 106 reads out the character pattern data string stored in the RAM 103 and transfers to a CRT (display apparatus) 107. The CRT 107 receives the character pattern data string, graphics data, and image data from the CRTC 106 and displays onto a display screen.

A DKC (disk control unit) 108 makes access control to external storage devices 109. As external storage devices 109, there are an FD (flexible disk device) 109a, an HD (hard disk device) 109b, a CD-ROM 109c, and the like. A character development processing program, a graphics development processing program, an image data processing program, and the like have been stored in the HD 109b. The character development processing program is a program for reading out the character pattern data (font data) or the font data and converting into the bitmap data. The graphics development processing program is a program for processing the graphics data. The image data processing program is a program for processing the image data.

Figure 13:
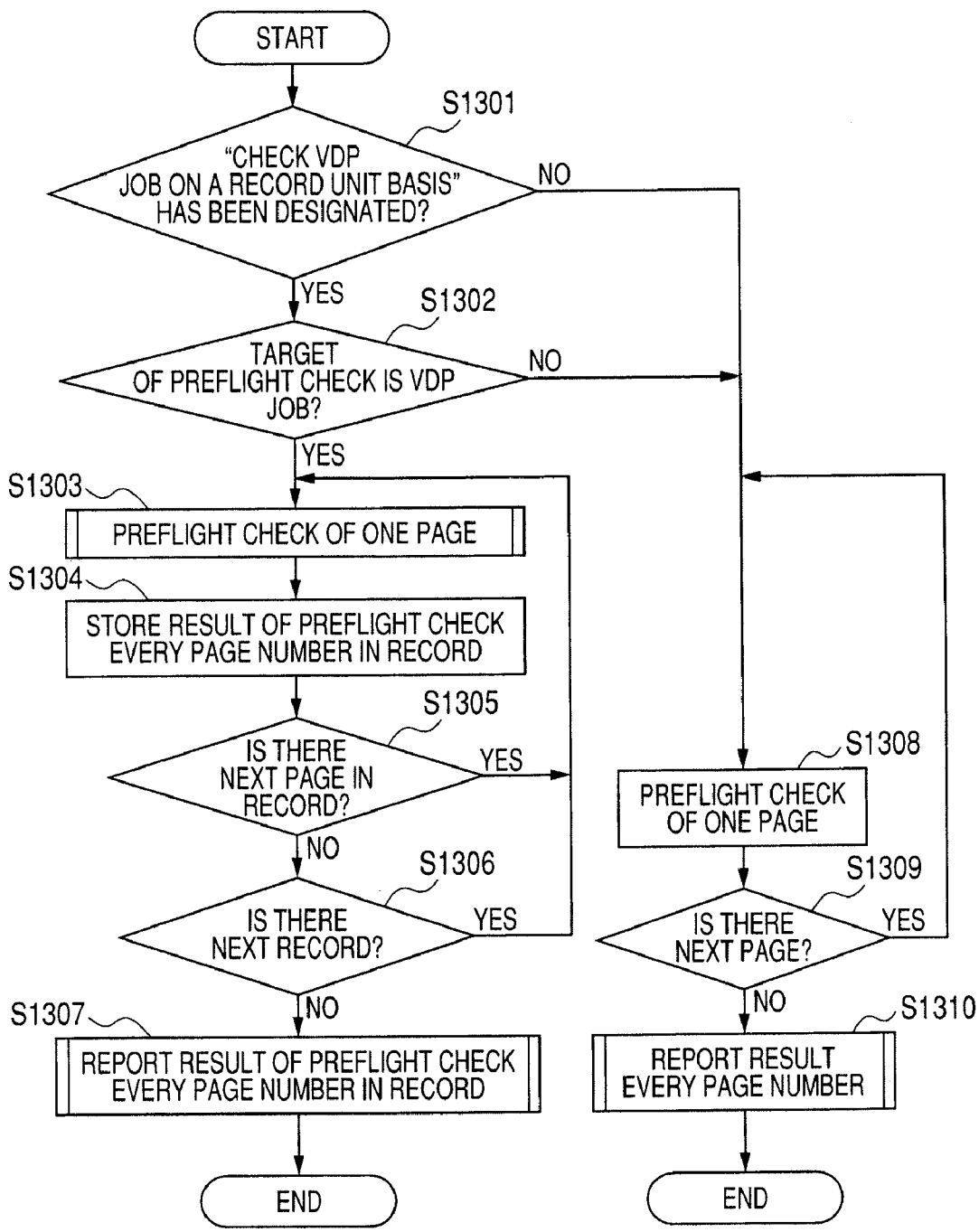
FIG. 13 illustrates the embodiment of the invention and is a flowchart for describing an example of processes at the time of performing the preflight check.
Figure 14:
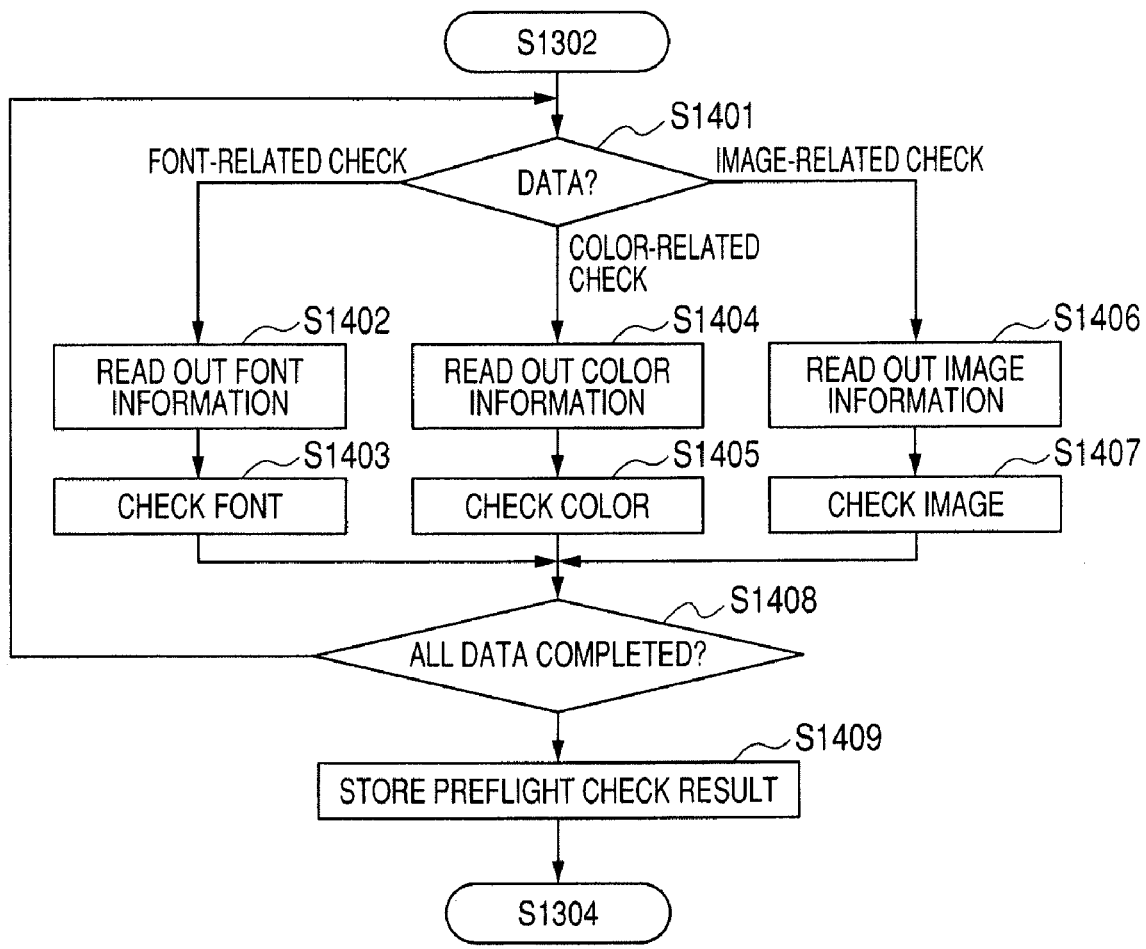
FIG. 14 illustrates the embodiment of the invention and is a flowchart for describing an example of a detailed process in step S1303 in FIG. 13 (preflight check of one page in one record).
Figure 15:
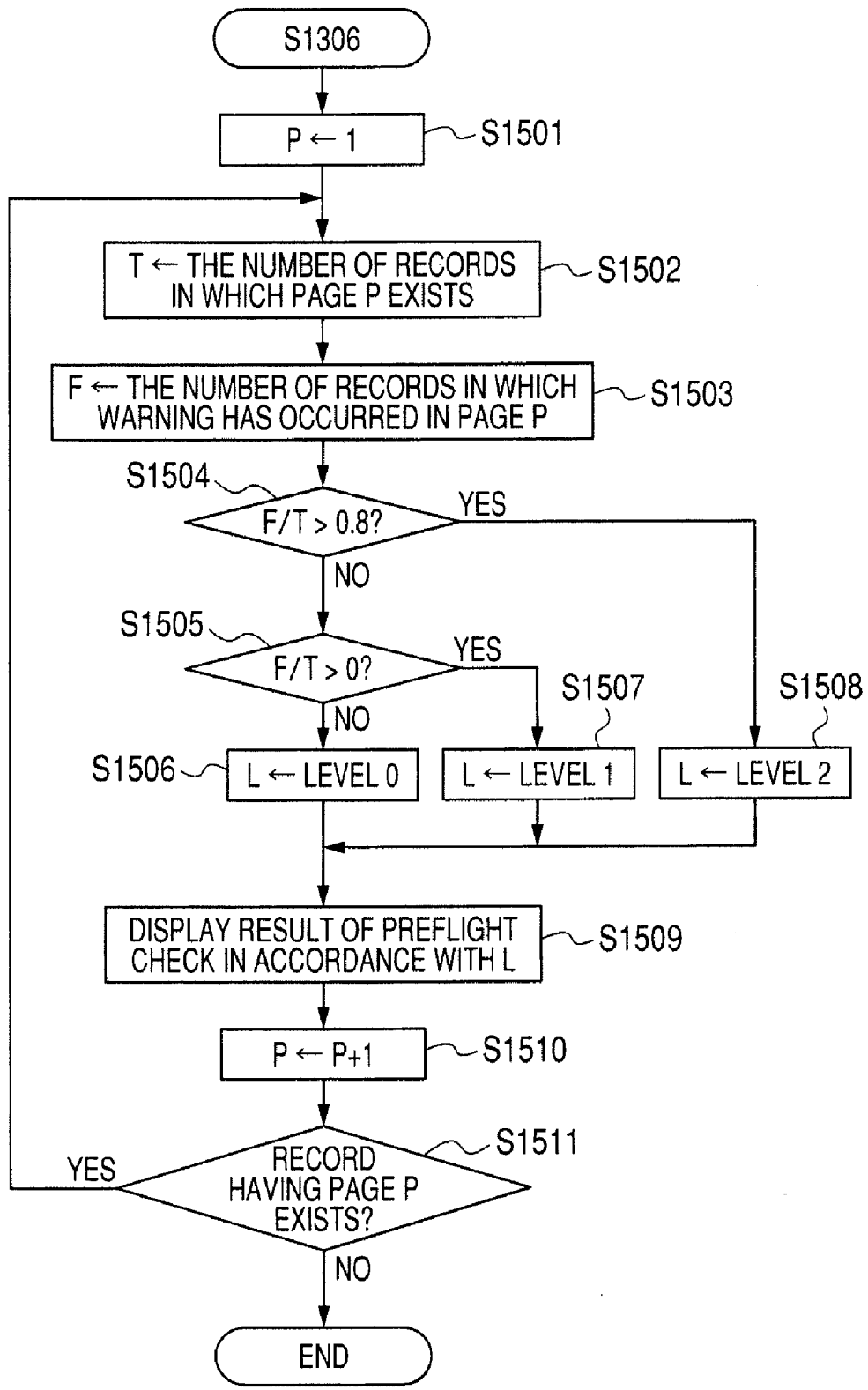
FIG. 15 illustrates the embodiment of the invention and is a flowchart for describing an example of a detailed process in step S1307 in FIG. 13 (report of a result of the preflight check of each page number in the record).

The application programs for executing processes shown in FIGS. 13 to 15 according to the embodiment and the like and related data are loaded into the RAM 103 from the external storage device 109 such as FD 109a or CD-ROM 109c and used by the CPU 101.

An NTC (network control unit) 110 controls the operation of an NT (network apparatus) 111. A system bus 112 is provided to transfer the data among the foregoing component elements illustrated in FIG. 3.

<Example of Memory Map in RAM in Embodiment>

Figure 4:
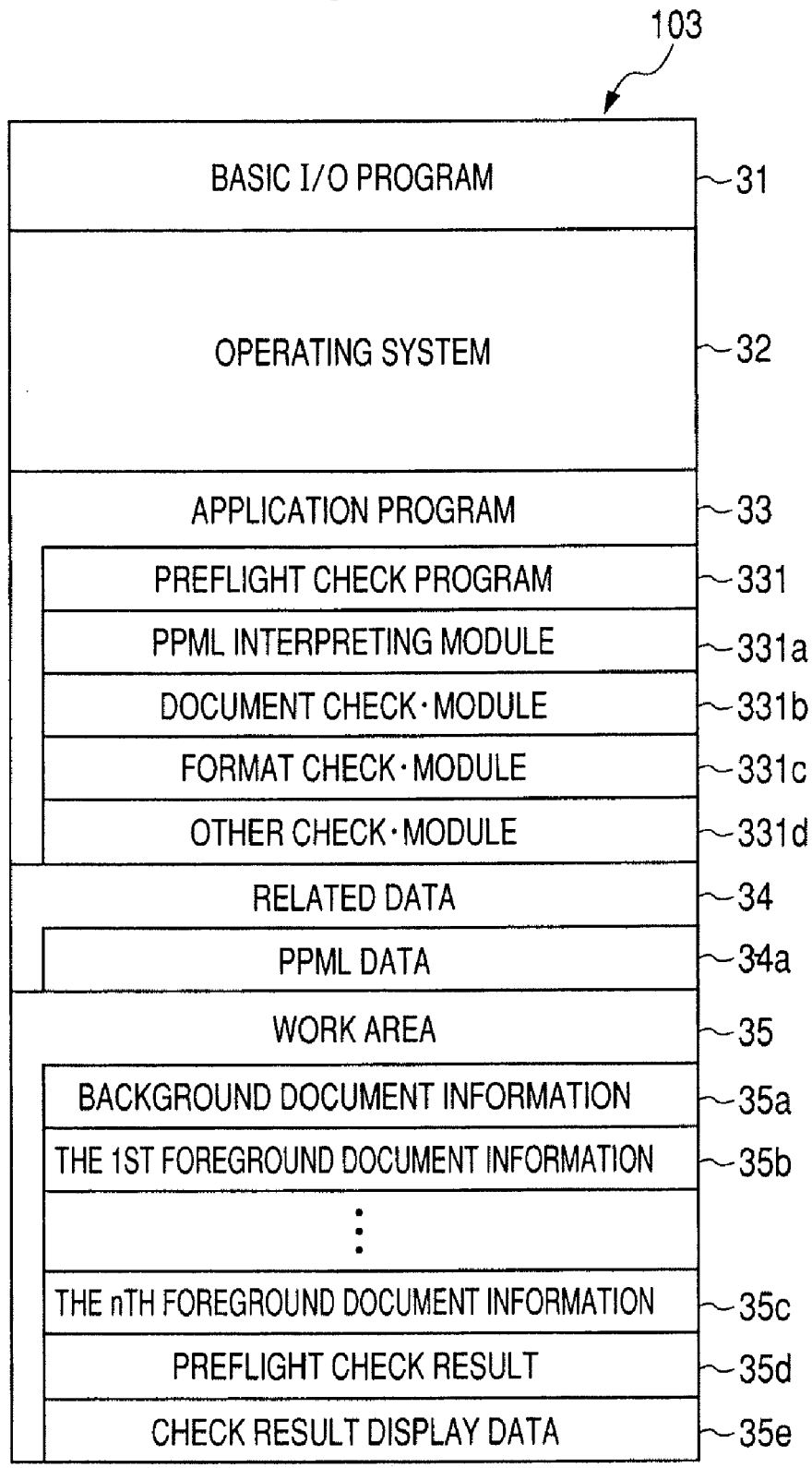
FIG. 4 illustrates the embodiment of the invention and is a diagram showing an example of a memory map in a RAM at the time of executing a document checking process (preflight check).

FIG. 4 is a diagram illustrating an example of a memory map in the RAM 103 at the time of executing the document checking process (preflight check). In FIG. 4, only information which is characteristic in the embodiment is illustrated and other information is not illustrated.

A basic I/O program 31 is read out by the system activating program in the ROM 102 and stored into the RAM 103. When the basic I/O program 31 is executed, an operating program (OS) 32 is read out of the HD 109b. An application program 33 and related data 34 are read out of the FD 109a or CD-ROM 109c as an external storage device 109 and installed into the HD 109b. When a power source of the apparatus is turned on, the application program 33 and the related data 34 are loaded from the HD 109b into the RAM 103 and can be executed. The application program 33 and the related data 34 are not installed into the HD 109b but can be also directly loaded from the FD 109a or CD-ROM 109c into the RAM 103 and executed. In the file server FS or the like, an alternating table, which will be described hereinafter, can be formed in a area of the related data 34. A work area 35 is used as a temporary storing area of the data which is being processed by the CPU 101.

In the embodiment, in the application program 33, there is a preflight check program 331 for executing processes as illustrated in FIGS. 13 to 15. In the application program 33, there is a PPML interpreting module 331a for interpreting data described by a PPML constructing the preflight check program 331 and extracting background documents and foreground documents. Further, in the application program 33, there is a document check module 331b for performing a preflight check of the background documents and the foreground documents. In addition to them, in the application program 33, there are also a format check module 331c for checking an overlap or the like of the foreground documents and other check modules 331d.

As related data 34, PPML data 34a which was input or received has been stored. Background document information 35a such as print conditions and the like of the background documents which have been interpreted by the PPML interpreting module 331a and extracted has been held in the work area 35. Further, first foreground document information 35b showing print conditions, a print layout, and the like of the first foreground document, . . . , and nth foreground document information 35c showing print conditions, a print layout, and the like of the nth foreground document have been held in the work area 35. A preflight check result 35d, check result display data 35e of a display screen for displaying a check result, a warning, etc., and the like have also been held in the work area 35.

<Schematic Constructional Example of Printer in Embodiment>

Figure 5:
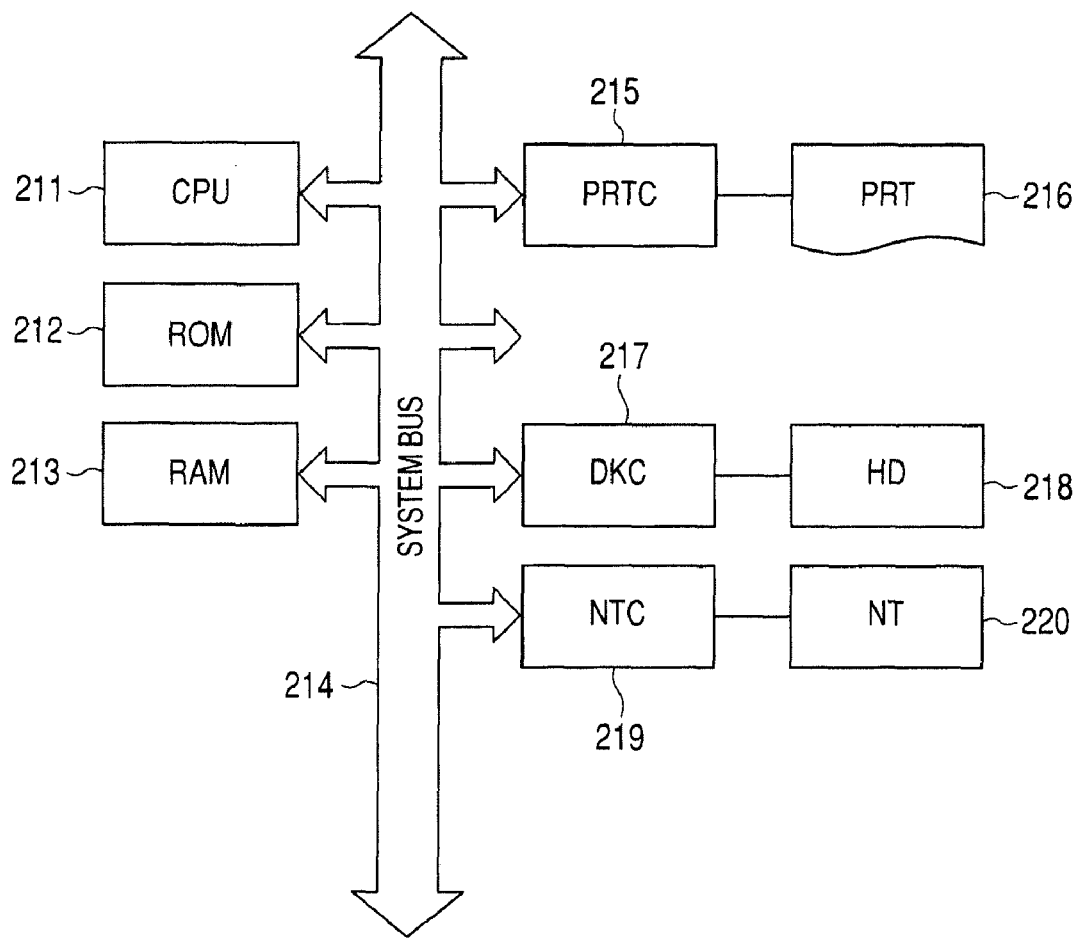
FIG. 5 illustrates the embodiment of the invention and is a block diagram showing an example of a schematic construction of a printer.

FIG. 5 is a block diagram illustrating an example of a schematic construction of the printer A. The printer A may be a printer of any one of the types such as laser beam printer, bubble jet (registered trademark) printer, thermal transfer printer, and the like.

As illustrated in FIG. 5, the printer A has a CPU 211, a ROM 212, a RAM 213, and a system bus 214. The printer A also has a printer controller (PRTC) 215, a printer engine (PRT) 216, and a disk controller (DKC) 217. The printer A further has a hard disk device (HD) 218, a network controller (NTC) 219, and a network apparatus (NT) 220. There is also a case where the DKC 217 and the HD 218 do not exist in dependence on the kind of printer.

The CPU 211 is a central processing unit for controlling the whole printer A. While using the RAM 213 as a work area or the like, the CPU 211 executes various kinds of processes necessary for printing according to the programs stored in the ROM 212. The system bus 214 is a passage for transmitting and receiving data and control signals among the foregoing component elements illustrated in FIG. 5. The character pattern data (font data) and the like have been stored in the ROM 212. The document data, font data, and the like are downloaded from the Web server WS into the RAM 213 or the HD 218. There is also a case where the image data (bitmap data) which has been developed into the image is downloaded from the print server PS into the RAM 213 or the HD 218.

The CPU 211 forms character pattern data or image data (bitmap data) according to the programs in the ROM 212 by using the document data and the font data supplied from the Web server WS.

The CPU 211 develops the bitmap data into a print buffer in the printer controller 215. When the bitmap data is supplied from the print server PS, the CPU 211 develops the bitmap data into the print buffer in the printer controller 215.

The printer controller 215 outputs a print control signal formed based on the bitmap data to the printer engine 216.

The network controller 219 controls the operation of the network apparatus (NT) 220 at the time of transmitting and receiving data to/from the client personal computers X and Y, the file server FS, and the print server PS through the network N.

When the preflight check in the embodiment is executed by the printer A, the preflight check program 331 illustrated in FIG. 4 is loaded into an application area in the RAM 213 together with the print control program.

<Example of Operation of Document Print System in Embodiment>

Subsequently, how the PPML preflight check is used on a work flow for the variable data printing process will be described with reference to FIGS. 6A to 6C.

By using the client personal computers X and Y, the requester executes the forming operation of the document data to be printed. When the formation of the variable data is finished, if a Web manuscript sending system or the like exists, the client personal computers X and Y uploads the document data into the file server FS and the print server PS by using the Web manuscript sending system, or the client personal computers X and Y transmit the document data to the print base.

The file server FS and the print server PS fetch the document data sent from the client personal computers X and Y. The file server FS and the print server PS execute such an operation that a charging process is executed according to a data size, the number of prints, or the like or requests of the client personal computers X and Y are transferred as job information to the print base. The file server FS and the print server PS also execute such an operation that a status on the print base side is checked and the status is transmitted to the client personal computers X and Y.

At the print base, the printing according to the requests from the clients is executed by using the document data received through the file server FS and the print server PS, the document data directly received from the client personal computers X and Y, or the document data input by the user. An output sheet size, the number of output sheets, a designation of finishing, a type of sheets which are used for printing, and the like are included in the requests from the clients.

When the clients upload the data to be printed, the file server FS and the print server PS have been notified of those requests. Therefore, in the case of receiving the document data through the file server FS and the print server PS, the print base receives those requests as job information from the file server FS and the print server PS. In the case of directly receiving the document data from the client personal computers X and Y, the print base directly receives those requests as job information from the client personal computers X and Y. In the case where the clients directly input the data to be printed, when the data is input, the clients are requested to notify the print base of those requests in writing or the like. The print base executes the printing process according to those requests.

Subsequently, how to handle the PPML preflight check according to the embodiment in those work flows will be described.

Figure 6A:
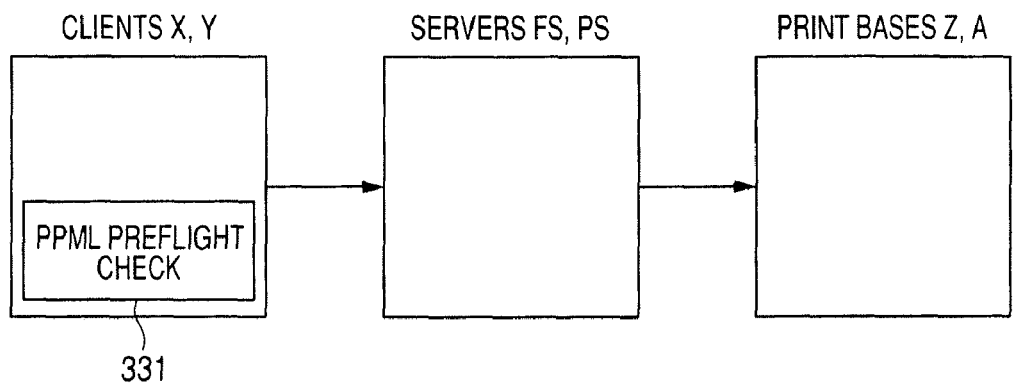
FIGS. 6A, 6B and 6C illustrate the embodiment of the invention and are diagrams for describing how a PPML preflight check is used on a workflow of a variable data printing process.

FIG. 6A illustrates a case of performing the PPML preflight check 331 by the client personal computers X and Y. The client personal computers X and Y execute the preflight check by themselves to the document data produced by the PPML by themselves (for example, steps S21 and S22 in FIG. 2) prior to sending the print request to the print base. Prior to uploading the document data to the file server FS and the print server PS or prior to inputting the document data to the print base, the client personal computers X and Y execute a correcting process to the items in which errors have been found out by the preflight check.

Figure 6B:
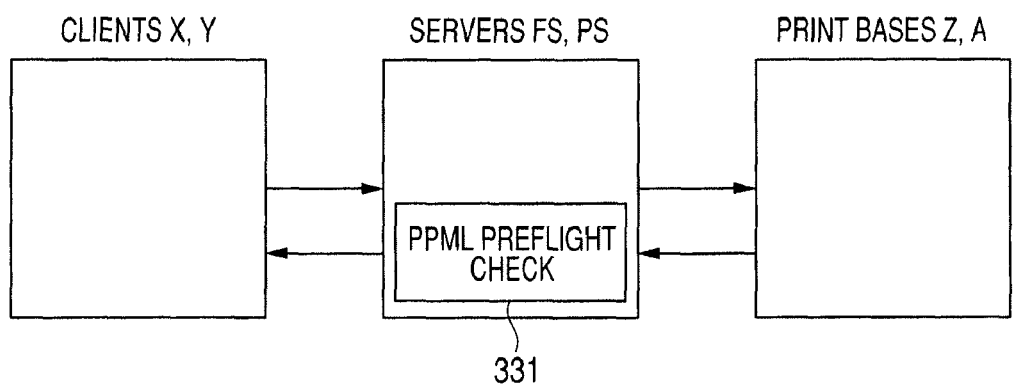

FIG. 6B illustrates a case of performing the PPML preflight check 331 by the file server FS and the print server PS. In this case, the client personal computers X and Y themselves do not have a module for performing the PPML preflight check. Therefore, after the document data formed by the PPML was uploaded into the file server FS and the print server PS, the file server FS and the print server PS confirm the document data. Therefore, the file server FS and the print server PS perform the preflight check according to requests from the clients to the uploaded document data (for example, step S23 in FIG. 2). The file server FS and the print server PS return the result of the preflight check (error information regarding the items in which the errors have been found out by the preflight check) to the client personal computers X and Y. The client personal computers X and Y, the file server FS, and the print server PS display the result of the preflight check (steps S31, S32). Based on the error information, the client personal computers X and Y discriminates whether the uploaded document data is printed as it is or the document data is corrected on the client personal computers X and Y sides and are uploaded again.

Figure 6C:
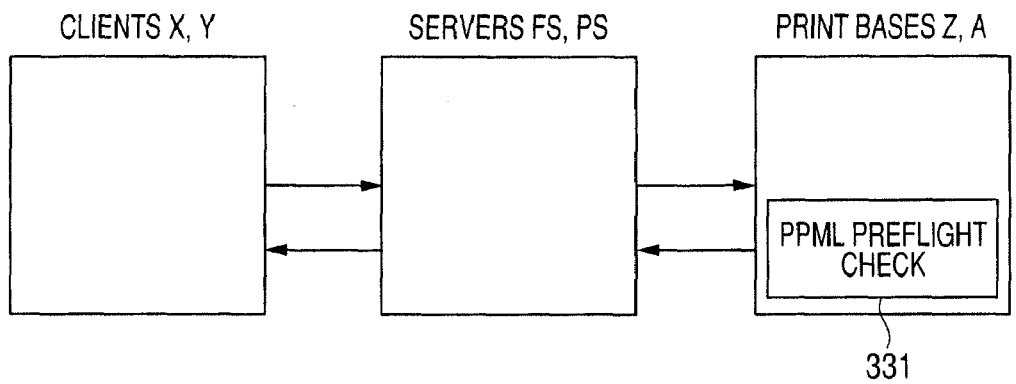

FIG. 6C illustrates a case of performing the PPML preflight check 331 by the print base. The print base performs the preflight check to the document data sent from the file server FS, the print server PS, or the client personal computers X and Y or to the document data input by the clients (for example, steps S24 and S25 in FIG. 2). The print base notifies the client personal computers X and Y of the result of the preflight check (error information regarding the items in which the errors have been found out by the preflight check). The client personal computers X and Y and the print base display the result of the preflight check (steps S31, S33, S34, and S35). With respect to the document data which can be corrected by the operator in the print base, the document data is corrected at the print base based on the operation of the operator according to intentions of the clients. With respect to the items to be corrected on the client personal computers X and Y side, the document data is corrected by the client personal computers X and Y. The client personal computers X and Y upload the corrected document data again into the file server FS and the print server PS, or the clients input the corrected document data again to the print base.

<Operation of Preflight Check in the Related Art>

Subsequently, the operation in the related art in the case of performing the preflight check will be described.

Figure 7:
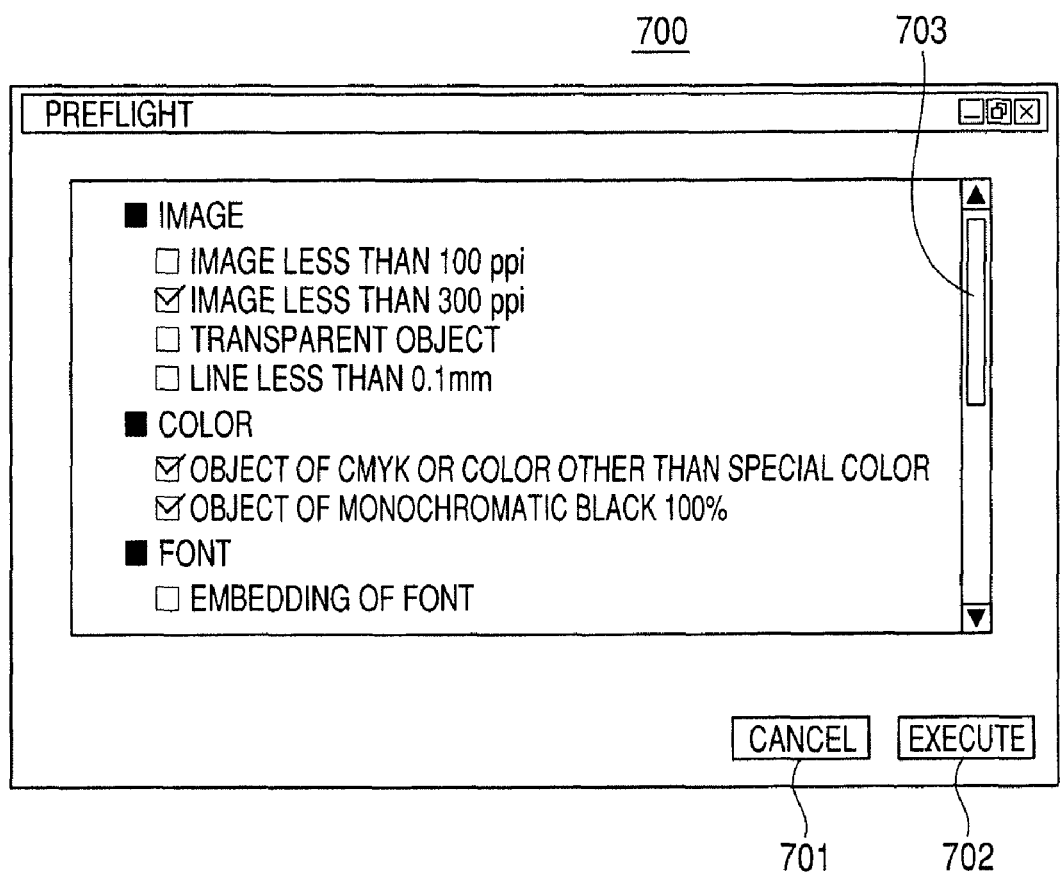
FIG. 7 illustrates a related art and is a diagram showing a preflight check setting display screen for setting items which are preflight-checked.

FIG. 7 is a diagram illustrating a preflight check setting display screen for setting the items which are preflight-checked.

As illustrated in FIG. 7, on a preflight check setting display screen 700, check items are displayed every group such as image, color, font, and the like. The operator checks check marks of desired check items, so that the check items to be preflight-checked are designated. The contents of the check items designated in this manner are stored into the RAM 213 by the CPU 101. The display screen can be scrolled by a scroll bar 703. By scrolling, other check items which are not displayed at present on the preflight check setting display screen 700 can be also displayed thereon. In the case of cancelling the preflight check, the operator clicks a cancel button 701. When the operator clicks an execute button 702, the preflight check is executed with respect to the check items designated by the preflight check setting display screen 700.

Figure 8:
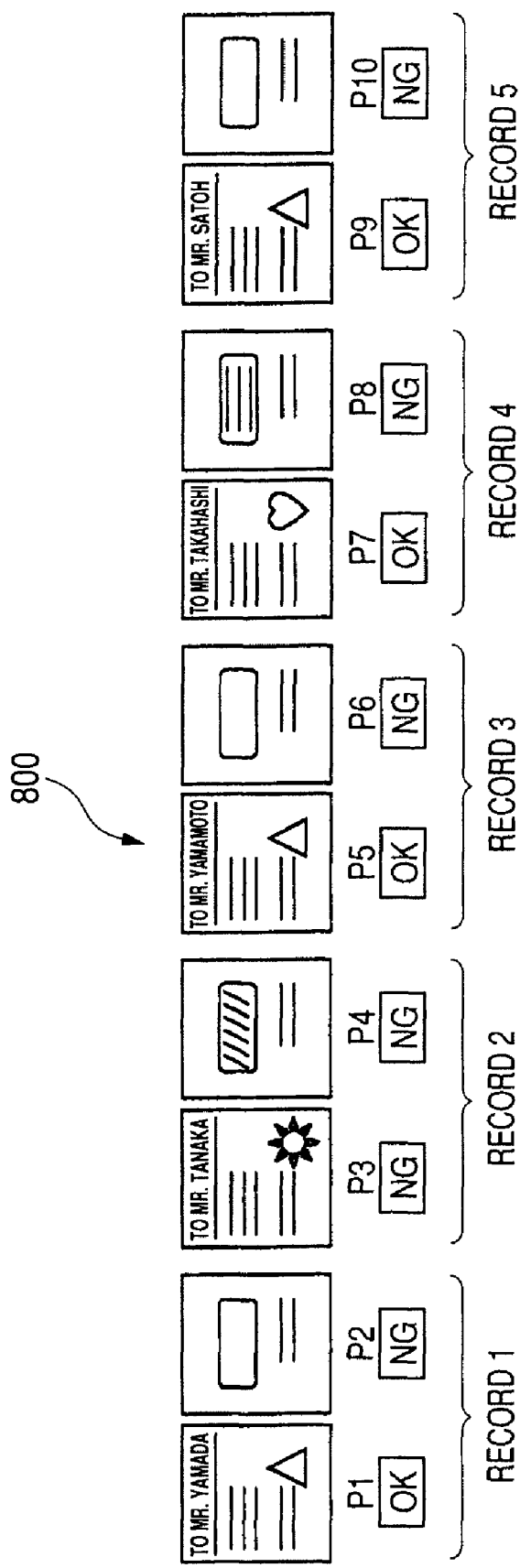
FIG. 8 illustrates the related art and is a diagram showing a variable data print job which is preflight-checked.

FIG. 8 is a diagram illustrating a variable data print job which is preflight-checked.

In FIG. 8, a variable data print job 800 is a job constructed by five records each of which is constructed by two pages.

In FIG. 8, P1, P2, P3, . . . shown under images of the respective pages denote serial page numbers of the variable data print job 800. Marks "OK" and "NG" shown under the serial page numbers indicate results obtained by performing the preflight check with respect to the check item of "object of CMYK or color other than special color". The page to which "OK" is shown indicates that the "object of CMYK or color other than special color" does not exist. The page to which "NG" is shown indicates that the "object of CMYK or color other than special color" exists.

Figure 9:
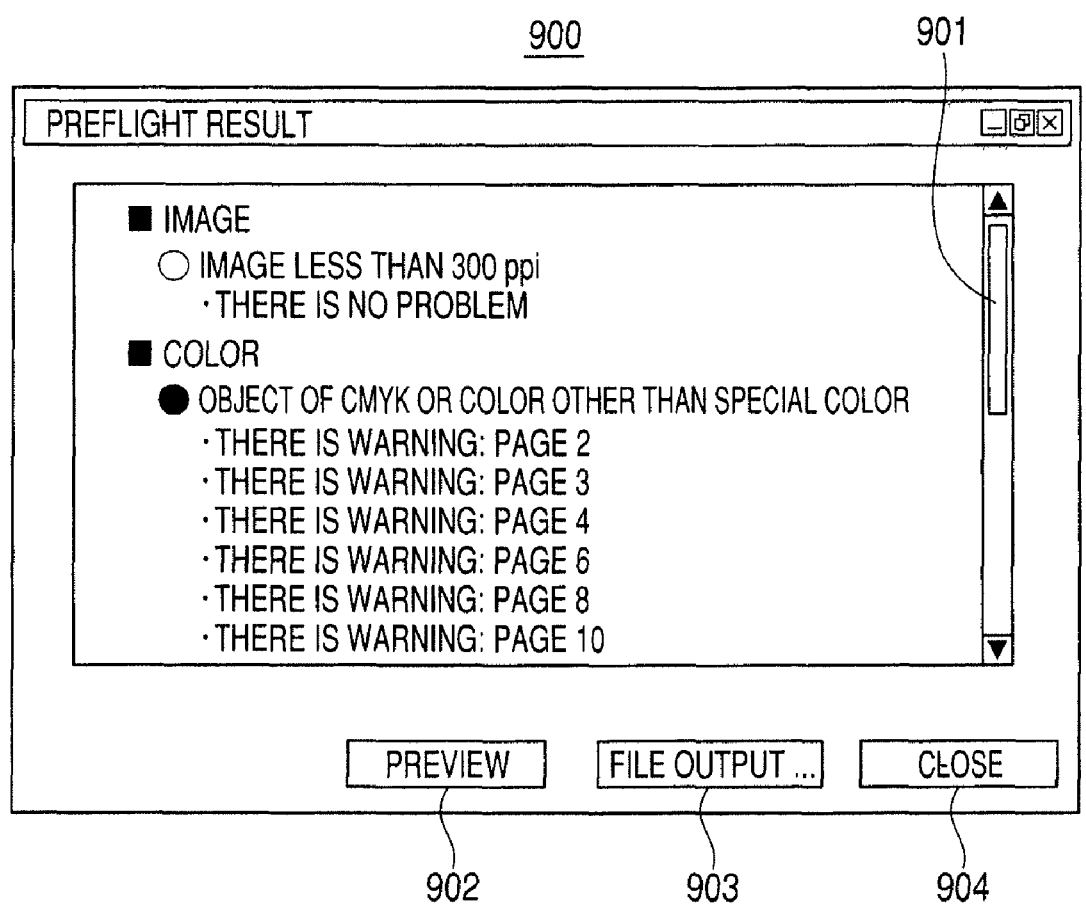
FIG. 9 illustrates the related art and is a diagram showing a preflight check result notifying display screen for notifying the operator of a preflight check result.

FIG. 9 is a diagram showing a preflight check result notifying display screen for notifying the operator of the preflight check result.

In FIG. 9, the result of the preflight check is shown on a preflight check result notifying display screen 900 every check item set by the preflight check setting display screen 700.

First, a result of the preflight check regarding an image group will be described. As a result obtained by preflight-checking the presence or absence of an image whose resolution is less than 300 ppi, in the variable data print job 800 illustrated in FIG. 8, the image whose resolution is less than 300 ppi does not exist at any page. Therefore, a result "there is no problem" is displayed on the preflight check result notifying display screen 900.

Subsequently, a result of the preflight check regarding a color group will be described. A result about whether or not the "object of CMYK or color other than special color" exists is displayed on each page as a result of the preflight check and in the variable data print job 800 illustrated in FIG. 8, the objects in which RGB has been designated exist on several pages. Therefore, "there is warning" is displayed on the preflight check result notifying display screen 900 with respect to the pages in which the "object of CMYK or color other than special color" exists among the serial pages of the variable data print job 800.

The display screen can be scrolled by a scroll bar 901 and the result which is not displayed at present on the preflight check result notifying display screen 900 (for example, result of a font group) can be also displayed. When the operator selects the line in which "there is warning" is displayed, this line is highlight-displayed. When the operator clicks a preview button 902 in this state, an image of the highlight-displayed page is displayed. In this image, the object in which the warning has occurred is emphasis-displayed. When the operator clicks a file output button 903, the results of the preflight check are printed in a lump. When the operator further clicks a close button 904, the display of the preflight check result notifying display screen 900 is finished.

The contents (operations) illustrated in FIGS. 7 to 9 are those executed in the related art. As illustrated in FIG. 9, the warning has been displayed by the serial page number in the related art. Therefore, the operator cannot discriminate whether the warning has been caused by a problem that occurred in a master object of the variable data print job or by a problem that occurred in a variable object, so that a load necessary to find out the portion to be corrected increases.

<Example of Operation of Preflight Check in Embodiment>

Subsequently, an example of the operation in the embodiment in the case of performing the preflight check will be described. As already described with reference to FIGS. 6A to 6C, the preflight check can be also performed in any of the client personal computers X and Y, the file server FS, the print server PS, and the print bases (print-base personal computer Z, printer A). The operation which will be described hereinafter and is executed at the time of performing the preflight check may be executed in any of the bases and is processed by the apparatus at the base.

Figure 10:
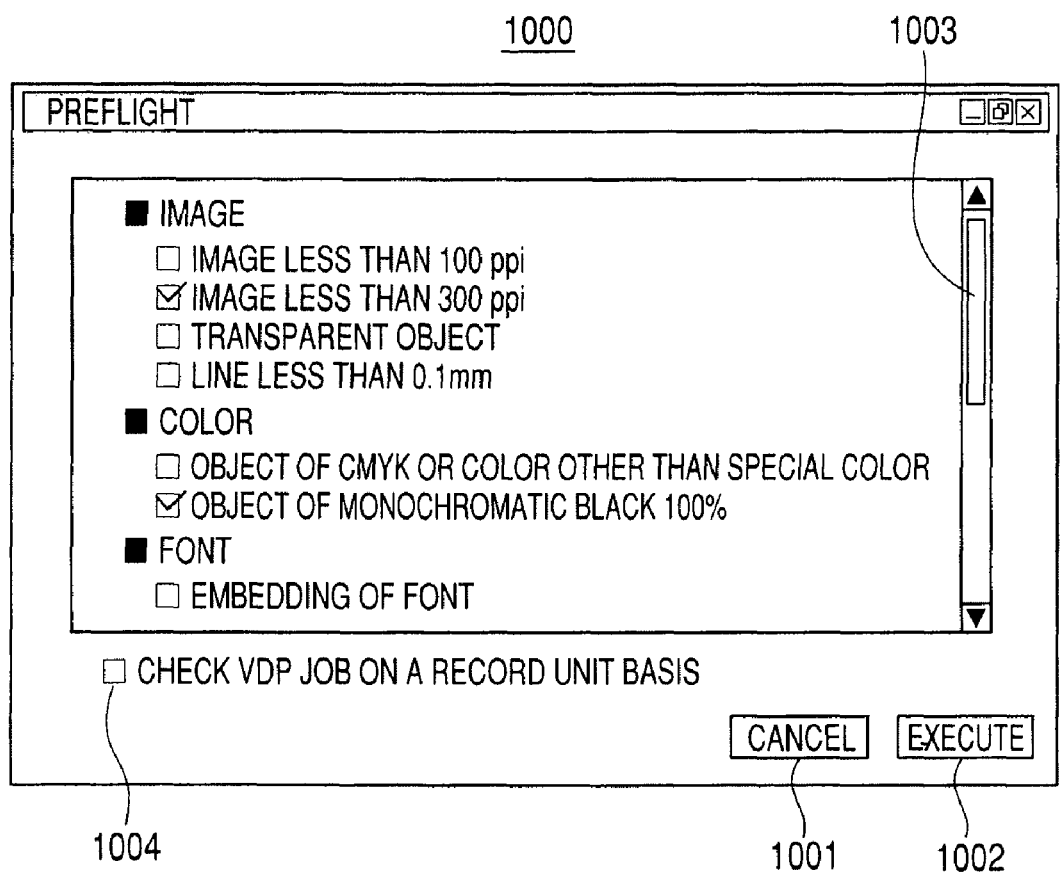
FIG. 10 illustrates the embodiment of the invention and is a diagram showing an example of a preflight check setting display screen for setting items which are preflight-checked.

FIG. 10 is a diagram showing an example of a preflight check setting display screen for setting items which are preflight-checked. In FIG. 10, points different from FIGS. 6A to 6C will be described in detail.

In a preflight check setting display screen 1000, when the operator checks a check box 1004 of "check VDP job on a record unit basis", the contents of the preflight checks which are not performed in the related art can be designated.

Figure 11:
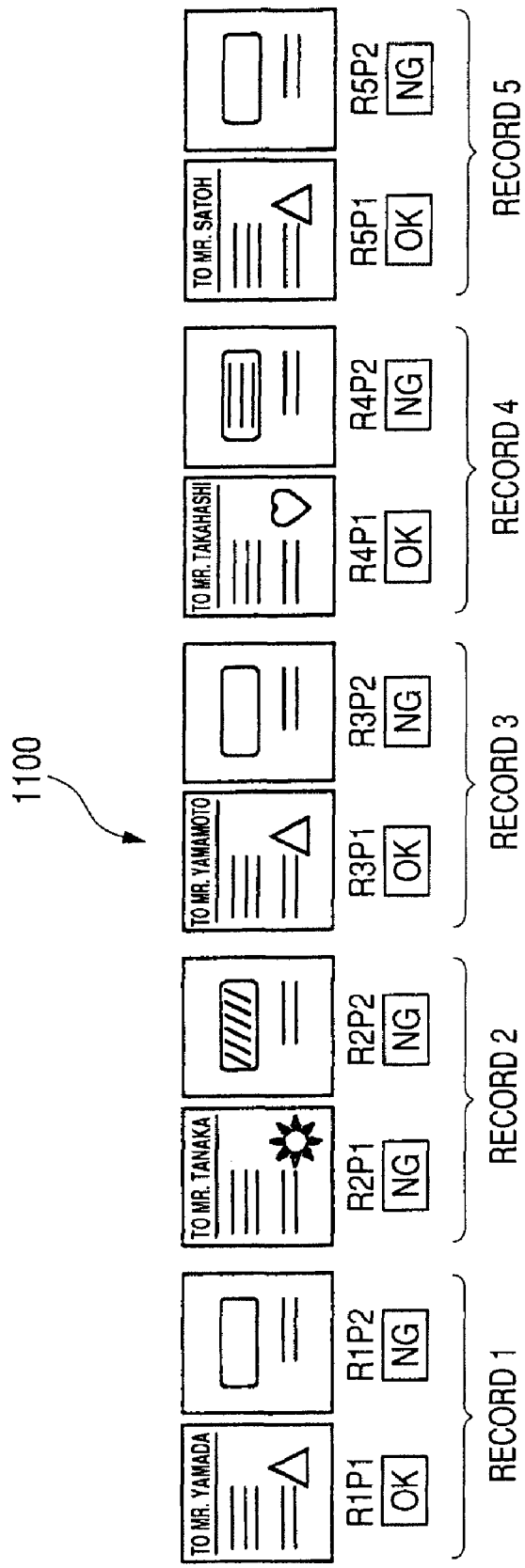
FIG. 11 illustrates the embodiment of the invention and is a diagram showing an example of a variable data print job which is preflight-checked.

FIG. 11 is a diagram showing an example of a variable data print job which is preflight-checked. Now, one document having one or more pages is assumed to be one record and among a plurality of records included in a variable data print job 1100, there are a common image portion which is common among the plurality of records and a variable image portion which is variable among the plurality of records. As mentioned above, the record corresponds to a data group necessary to form one document. For example, one record is constructed by data of a name of Mr. A, data of an address of Mr. A, and common image data which are necessary to produce a document for Mr. A. The data which is common among the plurality of records is also called a common data (master data) portion and the data which is variable among the plurality of records is also called a changeable data (variable data) portion. The variable data print job 1100 includes an instruction for producing the document of each record by synthesizing the data in the common image portion and the data in the variable image portion. Specifically describing, since the variable data print job 1100 includes an instruction for inserting desired contents data in a data area into the variable image portion which has been set into a template serving as a common image portion, the document of each record is produced and output.

The variable data print job 1100 illustrated in FIG. 11 is a job constructed by five records each of which is constructed by two pages. Although the variable data print job 1100 is generally a job having a larger number of records, in FIG. 11, for convenience of description, it is assumed that the variable data print job 1100 is constructed by five records. Naturally, the variable data print job 1100 may be a job constructed by the records of the number smaller than 5.

In FIG. 11, each of R1P1, R1P2, R2P1, R2P2, . . . shown under images of respective pages indicates a record number and a page number in the record of the variable data print job 1100. In the embodiment, the apparatus for performing the preflight check analyzes the variable data print job including an instruction for outputting those pages. In FIG. 11, a construction is substantially the same as that illustrated in FIG. 8 except a point that the page of each record is shown by the record number and the page number in the record instead of the serial page number of the variable data print job 1100. A command for dividing the record is included in the variable data print job 1100. Although there is also a case where such a command for dividing cannot be inserted depending on a language, in such a case, the CPU 101 analyzes a structure of a command designated in the variable data print job, thereby detecting a delimiter of the record. As a specific example, it is now assumed that the following rules have been designated for the variable data print job: that is, the common data is used in the first page, the variable data is used in the second page, the common data is used in the third page, and the variable data is used in the fourth page. In this case, since a possibility that one record is constructed by two pages is high, the CPU 101 detects that an interval between the second and third pages is a delimiter of the record. In this manner, the CPU 101 may detect the delimiter of the record by analyzing a repetitive pattern of the common data and the variable data.

Figure 12:
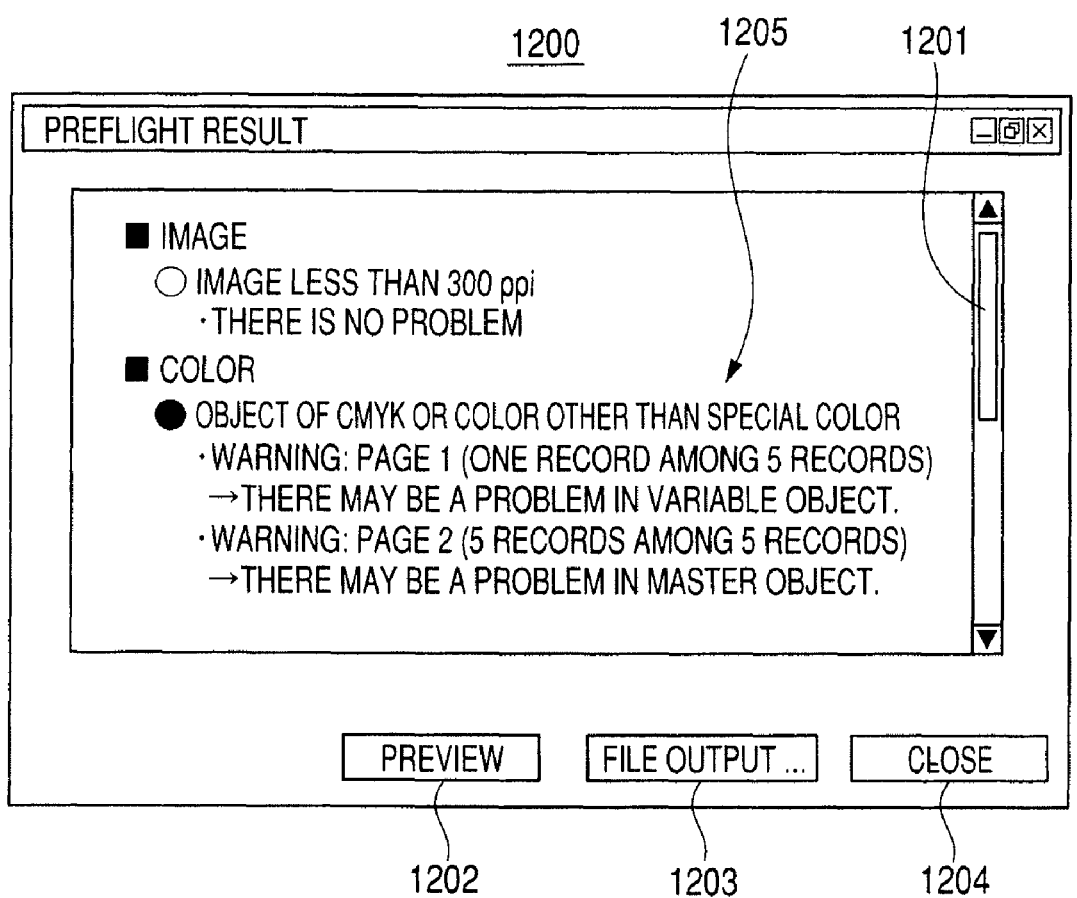
FIG. 12 illustrates the embodiment of the invention and is a diagram showing an example of a preflight check result notifying display screen for notifying the operator of a preflight check result.

FIG. 12 is a diagram showing an example of a preflight check result notifying display screen for notifying the operator of the preflight check result.

In FIG. 12, on a preflight check result notifying display screen 1200, the result of the preflight check is displayed every check item which has been set by the preflight check setting display screen 1000. Also in FIG. 12, it will be described in detail by paying an attention to a difference between FIG. 12 and FIG. 9.

A result of the preflight check regarding the color group will now be described. As a result obtained by preflight-checking whether or not the "object of CMYK or color other than special color" exists in each page, in the variable data print job 1100 illustrated in FIG. 11, an object in which RGB has been designated exists in each of several pages. Therefore, on the preflight check result notifying display screen 1200, the warning is displayed every page number in the record.

"Warning: page 1 (one record among 5 records)" in a warning display 1205 denotes that "in one record among 5 records, the "object of CMYK or color other than special color" exists in the first page in the record". This corresponds to a state where, in FIG. 11, although the check result indicates "NG" in the first page of the second record (R2P1), the check result indicates "OK" in the first page of each of the other records (R1P1, R3P1, R4P1, R5P1). Further, a message of "→ there may be a problem in variable object." is displayed under "Warning: page 1 (one record among 5 records)". This means that there is a possibility that the warning has occurred by the variable object.

Similarly, "Warning: page 2 (5 records among 5 records)" in the warning display 1205 denotes that "among 5 records among 5 records, the "object of CMYK or color other than special color" exists in the second page in the record". This corresponds to a state where, in FIG. 11, the check result indicates "NG" in the second page of each of all of the records (R1P1, R2P2, R3P2, R4P2, R5P2). Further, a message of "→ there may be a problem in master object." is displayed under "Warning: page 2 (5 records among 5 records)". This means that there is a possibility that the warning was caused by the master object.

The display screen can be scrolled by a scroll bar 1201. By scrolling, the result which is not displayed at present on the preflight check result notifying display screen 1200 (for example, result of the font group) can be also displayed. Since a preview button 1202, a file output button 1203, and a close button 1204 are substantially the same as the buttons 902 to 904 in FIG. 9, their detailed description is omitted here.

As mentioned above, in the embodiment, an occurrence situation of the warning is displayed by the page number in the record instead of the serial page number of the variable data print job 1100. Further, a prediction result showing whether the warning has occurred in the master object of the variable data print job 1100 or the warning has occurred in the variable object is shown. Therefore, the operator confirms in which one of the master object and the variable object of the variable data print job the problem has occurred and can more easily find out the portion to be corrected as compared with the case in the related art.

<Example of Processing Flow for Preflight Check in Embodiment>

Subsequently, an example of processes at the time of performing the preflight check will be described with reference to a flowchart of FIG. 13. As already described with reference to FIGS. 6A to 6C, the preflight check can be executed in any of the client personal computers X and Y, the file server FS, the print server PS, and the print bases (print-base personal computer Z, printer A). The operations in the flowcharts which will be described in FIG. 13 and subsequent diagrams may be executed in any of the bases and are processed by the control unit at the base.

First, in step S1301, the CPU 101 confirms the set contents of the preflight check setting display screen 1000 stored in the RAM 213 and discriminates whether or not the check box 1004 of "check VDP job on a record unit basis" has been designated.

As a result of the discrimination, if the check box 1004 is not designated, the processing routine advances to step S1308, which will be described hereinafter. If the check box 1004 has been designated, step S1302 follows.

In step S1302, the CPU 101 discriminates whether or not a target of the preflight check is the variable data print job (VDP job). This discrimination is made based on a description language of the print job, an application which has instructed printing or print attributes. For example, if it is determined that the print job has been described by the PPML language, the CPU 101 decides that the print job is the variable data print job. As a result of this discrimination, if the target of the preflight check is not the variable data print job, the processing routine advances to step S1308, which will be described hereinafter. If the target of the preflight check is the variable data print job, step S1303 follows. The variable data print job has one or more records each of which is constructed by one or more pages.

Processes after step S1303 are characteristic processes which are executed with respect to the variable data print job.

First, in step S1303, the CPU 101 performs the preflight check of one page in one record. The detailed contents of this process will be described hereinafter with reference to FIG. 14.

Subsequently, in step S1304, the CPU 101 stores the result of the preflight check into the RAM 103 every page number in the record.

Subsequently, in step S1305, the CPU 101 discriminates whether or not a next page exists in the record. As a result of this discrimination, if the next page exists in the record, the processing routine is returned to step S1303 in order to execute the processes of the next page. If the next page does not exist in the record, step S1306 follows.

In step S1306, the CPU 101 discriminates whether or not the next record exists in the variable data print job. As a result of this discrimination, if the next record exists in the variable data print job, the processing routine is returned to step S1303 in order to execute the processes of the next record. If the next record does not exist in the variable data print job, step S1307 follows.

In step S1307, the CPU 101 reports the result of the preflight check every page number in the record. The detailed contents of this process will be described hereinafter with reference to FIG. 15.

Processes after step S1308 are processes in the normal print job.

First, in step S1308, the CPU 101 performs the preflight check of one page.

Subsequently, in step S1309, the CPU 101 discriminates whether or not the next page exists in the print job. As a result of this discrimination, if the next page exists in the print job, the processing routine is returned to step S1308 in order to execute the processes of the next page. If the next page does not exist in the print job, step S1310 follows.

In step S1310, the CPU 101 reports the preflight check result every serial page number in the print job. The preflight check result can be reported here like a preflight check result notifying display screen 900 illustrated in FIG. 9.

<Example of Process of Preflight Check of One Page>

FIG. 14 is a flowchart for describing an example of a detailed process in step S1303 (preflight check of one page in one record) in FIG. 13. Step S1308 in FIG. 13 can be also realized by a flowchart of FIG. 14.

First, in step S1401, the CPU 101 discriminates whether or not a font-related check has been designated upon setting of the check items of the preflight in FIG. 10. If the font-related check has been designated, step S1402 follows. If it is not designated, step S1404 follows.

Steps S1402 and S1403 relate to processes in which the CPU 101 performs the preflight check of an output environment regarding the font.

First, in step S1402, the CPU 101 checks the details of the font-related data. For example, if a driver has been set to a setting of "font of PC is used" based on the setting of a printer driver, the CPU 101 reads out font information from a PC environment file and writes the read-out font information into the RAM 103 as font environment information. If the driver has been set to a setting of "font of printer is used", the CPU 101 reads out font information from a printer environment file and writes the read-out font information into the RAM 103 as font environment information.

The CPU 101 reads out the contents (font information) of the font used in the document as font information of the document from the data of the print job and writes into the RAM 103. The data which is read out here includes a typeface name of the font, the presence or absence of embedment of the font to the typeface name, and the like. The embedment of the font denotes that by including the font data into the document, if the font has been embedded, the font designated at the time of producing the document can be used irrespective of the environment.

Subsequently, in step S1403, the CPU 101 collates the font environment information of the PC or printer which has been read out in step S1402 with the font information of the document. If the font has been embedded in the document, the embedded font is used and the document is output. Therefore, even if the font is not included in the font environment information of the PC or printer, no problem will occur. On the other hand, if the font is not embedded in the document and if the fonts designated in the document are not included in the font environment information of the PC or printer, such a font is replaced by another font. In such a case, therefore, the CPU 101 refers to an alternating table stored in the printer driver and outputs data showing which one of the fonts designated in the document is replaced by which one of the fonts.

If the font cannot be replaced even by referring to the alternating table, the CPU 101 outputs data for requesting the operator to install the font or designate the alternating font. The output data is stored into the RAM 103 as a font information collation file which is temporarily produced during the preflight check.

In the case where the font which is not installed in the personal computer or the printer is used in the document, the alternating table is a table showing a correspondence relation for replacing the font to the font installed in the personal computer or the printer.

As mentioned above, in the case where a resource (in this example, font) which is used in the document is not embedded in the document and is not provided in the print environment, the resources designated in the document cannot be used. Therefore, the CPU 101 produces warning information showing such a fact and outputs.

In step S1401, the CPU 101 discriminates whether or not the color-related check has been designated in the setting of the check items of the preflight in FIG. 10. If the color-related check has been designated, step S1404 follows. The CPU 101 checks the details of the color-related data. As color-related data, there are information showing whether or not the printer is a color printer, and in the case of the color printer, information showing whether or not the CMYK data can be handled, and the like. As color-related data included in the PC environment file, there is a name of a color profile existing in the PC environment. In step S1404, the CPU 101 reads the color-related data from the RAM 103 as color environment information.

The CPU 101 reads out the portion of the color-related data in the document as color information of the document. As color information of the document which is read out here, there are a name of a source color profile, the presence or absence of the embedment of the data of the source color profile, and the like.

Subsequently, in step S1405, the CPU 101 collates the color environment information read out in step S1404 with the color information of the document.

If an output apparatus (printer which is used) is a monochromatic printer, the CPU 101 outputs a fact, as a result of the preflight check, that the color data cannot be output. If the output apparatus (printer which is used) is a printer which cannot handle the CMYK data, the CPU 101 outputs a fact that the CMYK output is converted into the RGB output. If the input profile is not embedded, the CPU 101 discriminates whether or not the profile name included in the color information of the document exists on a profile list stored by an environment inspection of the PC (that is, whether or not it is included in the color information). As a result of the discrimination, if the profile name included in the color information of the document does not exist on the profile list stored by the environment inspection of the PC, the CPU 101 outputs a fact that the profile does not exist as a result of the preflight check. Those outputs are stored as a color information collation file which is temporarily produced during the preflight check.

In step S1401, the CPU 101 discriminates whether or not the image-related check has been designated in the setting of the check item of the preflight in FIG. 10. If the image-related check has been designated, step S1406 follows. In step S1406, the CPU 101 checks the details of the image-related data. As image-related information, there are information such as a resolution and the like of the printer. In step S1406, the CPU 101 writes the image-related data as image environment information into the RAM 103.

The CPU 101 reads out the image-related data portion in the document as image information of the document and writes into a predetermined area in the RAM 103. As image information of the document which is read out here, there are the resolution and the like of each image included in the document.

Subsequently, in step S1407, the CPU 101 collates the image environment information read out in step S1406 with the image information of the document. In the embodiment, when the resolution of each image data is equal to or less than ⅕ of a resolution of the output apparatus (printer which is used), the CPU 101 determines that the result of the preflight check indicates an error. That is, when the resolution of the printer is equal to 600 dpi, if the resolution of the image data is equal to 120 dpi or less, the CPU 101 outputs a name of the image of the image data and a fact that the resolution of the image data is small. The output is stored as image information collation file which is temporarily produced during the preflight check. The foregoing value of ⅕ or less is an example and another condition may be used.

As mentioned above, even in the case where the resource (in this example, print engine) which is used in the document has been provided in the print environment, when the attribute (in this example, resolution) regarding the resource does not coincide with the requirement, the CPU 101 produces warning information showing such a fact and outputs.

When the check (preflight check) of the font, color, or image is finished as mentioned above, step S1408 follows. In step S1408, the CPU 101 discriminates whether or not the preflight check has been completed with respect to all data existing in the corresponding page.

As a result of the discrimination, if the preflight check is not completed yet with respect to all of the data in the corresponding page, the processing routine is returned to step S1401 in order to execute the preflight check with respect to the next data. If the preflight check has been completed with respect to all of the data in the corresponding page, the processing routine advances to step S1409. In step S1409, the CPU 101 stores a preflight check result file showing the results of the preflight check of the corresponding page and the warning information in which the output results have been collected into the RAM 103.

As mentioned above, according to the embodiment, for example, by executing the process of step S1303 in FIG. 13 (FIG. 14).

<Example of Process for Reporting Result of Preflight Check>

FIG. 15 is a flowchart for describing an example of a detailed process in step S1307 in FIG. 13 (report of the result of the preflight check of each page number in the record).

First, in step S1501, the CPU 101 sets 1 into a variable P showing the number of pages in the record.

Subsequently, in step S1502, the CPU 101 sets the number of records in which the page number P exists in the variable data print job into a variable T. For example, since the records in which the page number 1 exists are the records 1 to 5 in FIG. 11, 5 is set into the variable T. As mentioned above, in the embodiment, for example, by executing the process of step S1502, an example of a second extracting unit is realized.

Subsequently, in step S1503, the CPU 101 sets the number of records in which the warning has occurred at the page number P as a result of the preflight check into a variable F. For example, since the records in which the warning has occurred at the page number 1 are only the record 2 in FIG. 11, 1 is set into the variable F. As mentioned above, in the embodiment, for example, by executing the process of step S1503, an example of an extracting unit is realized.

Subsequently, in step S1504, the CPU 101 discriminates whether or not a ratio F/T is larger than 0.8. As a result of the discrimination, if the ratio F/T is larger than 0.8, step S1508 follows and the CPU 101 sets a code indicative of level 2 into a variable L.

If the ratio F/T is equal to 0.8 or less, step S1505 follows. In step S1505, the CPU 101 discriminates whether or not the ratio F/T is larger than 0. As a result of the discrimination, if the ratio F/T is larger than 0, step S1507 follows and the CPU 101 sets a code indicative of level 1 into the variable L.

If NO in steps S1504 and S1505, that is, if the ratio F/T is equal to 0, step S1506 follows and the CPU 101 sets a code indicative of level 0 into the variable L.

When the code is set into the variable L as mentioned above, the processing routine advances to step S1509. In step S1509, the CPU 101 displays the result of the preflight check according to the value of the variable L as will be described hereinafter.

Subsequently, in step S1510, the CPU 101 adds 1 to the variable P showing the number of pages in the record.

Subsequently, in step S1511, the CPU 101 discriminates whether or not the records having the page number P exist in the variable data print job. As a result of the discrimination, if the records having the page number P exist in the variable data print job, the processing routine is returned to step S1502 in order to display the result of the preflight check of the page number P. If the records having the page number P do not exist in the variable data print job, the processing routine is finished.

Specifically speaking, the process for displaying the result of the preflight check according to the value of the variable L in step S1509 is as follows.

First, if the code indicative of level 0 has been set in the variable L, since this means that the warning does not occur, the result is not displayed. If the code indicative of level 1 has been set in the variable L, with respect to the page number P of the processing target, since the warning has occurred in the records of 80% or less, the message of "there may be a problem in variable object." is displayed.

If the code indicative of level 2 has been set in the variable L, with respect to the page number P of the processing target, since the warning has occurred in the records over 80%, the message of "there may be a problem in master object." is displayed. When the problem occurs in the master object, ordinarily, the warning occurs in all of the records. However, since there is a possibility that the records in which the warning does not occur if the master object is hidden by the variable object exist, in the embodiment, 80% is set to a threshold value of the display switching. The threshold value may be set to an arbitrary value other than 80%, a fixed value, or a value which can be changed by the user.

As mentioned above, in the embodiment, for example, by executing the process of step S1509 in FIG. 15, an example of an output unit is realized.

In the flowchart of FIG. 15, the process of step S1509 may be executed after step S1511. By this method, with respect to all pages of the variable data print job, after the contents which are displayed as a result of the preflight check were set, the result of the preflight check can be displayed (that is, the result of the preflight check can be displayed as illustrated in FIG. 12).

As mentioned above, in the embodiment, to each of a plurality of records of the variable data print job 1100, the page number in the record is allocated and the preflight check is performed every page of the page number. After that, the records in which the same kind of (or the same) problem has occurred in the page of the same page number are extracted from the records included in the variable data print job 1100. A ratio of the number of extracted records to the number of all of the records having the page of such a page number is calculated. According to such a ratio, whether the problem has occurred with respect to the master object or the problem has occurred with respect to the variable object is presumed. For every page in which the problem has occurred, a message about whether the problem in such a page has occurred with respect to the master object or has occurred with respect to the variable object is displayed. Therefore, the operator can be made to easily discriminate whether the problem which has been found out in the preflight is a problem of the master portion which is common every record or it is a problem of the variable data portion which differs every record. Consequently, an efficiency of the preflight checking step in the printing step can be improved.

In the embodiment, the ratio of the records in which the problem has occurred in the page of the page number P as a result of the preflight check to the number of records in which the page number P exists is calculated and compared with the threshold value. By this method, even if the number of pages of a plurality of records in the variable data print job is not constant, the correct process can be executed. However, it is not always necessary to use such a method. For example, if it is predetermined that the number of pages of a plurality of records in the variable data print job is constant, the number of records in which the problem has occurred in the page of the page number P may be compared with the threshold value in place of the foregoing ratio.

According to the invention, the number of records in which the same kind of problem has occurred in the page of the same page number is extracted based on the result of the inspection before the output to a plurality of records. Whether the problem is a problem of the common data portion or is a problem of the variable data portion is presumed by using the number of extracted records and output. Therefore, whether the problem which has been found out in the inspection before the output of the job is a problem of the common data portion or is a problem of the variable data portion can be notified more easily than that in the related art.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-232398, filed Sep. 10, 2008, which is hereby incorporated by reference herein in its entirety.

What is claimed is:

1. A data processing apparatus comprising:
a processor and memory, cooperating to function as:
an analyzing unit that analyzes data for outputting a document by synthesizing a common object which is common among a plurality of records and a variable object which can vary among the plurality of records;
an extracting unit that extracts the number of records in which a problem has occurred in a same page by using a result analyzed by the analyzing unit;
a predicting unit that predicts whether the problem has been caused by the common object or has been caused by the variable object by using the number of records extracted by the extracting unit; and
an output unit that outputs a result predicted by the predicting unit.

2. An apparatus according to claim 1, wherein when all records in the data are extracted by the extracting unit, the predicting unit predicts that the problem has been caused by the common object.

3. An apparatus according to claim 1, wherein the output unit displays the result predicted by the predicting unit to a displaying apparatus every the page number.

4. An apparatus according to claim 1, wherein the analyzing unit analyzes the job formed based on data described by a language which can define the variable object.

5. A data processing method comprising:
analyzing data for outputting a document by synthesizing a common object which is common among a plurality of records and a variable object which can vary among the plurality of records;
extracting the number of records in which a problem has occurred in a same page by using an analysis result obtained in the analyzing;
predicting whether the problem has been caused by the common object or has been caused by the variable object by using the extracted number of records; and
outputting a predict result obtained in the predicting.

6. A non-transitory computer-readable storage medium for storing a computer program which causes a computer to execute a data processing method comprising:
analyzing data for outputting a document by synthesizing a common object which is common among a plurality of records and a variable object which can vary among the plurality of records;
extracting the number of records in which a problem has occurred in a same page by using an analysis result obtained in the analyzing;
predicting whether the problem has been caused by the common object or has been caused by the variable object by using the extracted number of records; and
outputting a predict result obtained in the predicting.

* * * * *